(12) United States Patent
Tanaami et al.

(10) Patent No.: US 12,422,922 B2
(45) Date of Patent: Sep. 23, 2025

(54) INTERFACE APPARATUS AND COEXISTENCE EXPERIENCE PROVIDING SYSTEM

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 18/664,754

(22) Filed: May 15, 2024

(65) Prior Publication Data

US 2024/0393869 A1 Nov. 28, 2024

(30) Foreign Application Priority Data

May 26, 2023 (JP) .................................. 2023-087220

(51) Int. Cl.
*G06F 3/01* (2006.01)
*A63F 13/837* (2014.01)
*G06F 3/14* (2006.01)
*G06T 15/20* (2011.01)

(52) U.S. Cl.
CPC ............ *G06F 3/012* (2013.01); *A63F 13/837* (2014.09); *G06F 3/14* (2013.01); *G06T 15/20* (2013.01)

(58) Field of Classification Search
CPC . G06F 3/012; G06F 3/14; G06F 3/011; G06F 3/017; G06F 3/0304; G06F 3/013; G06F 2203/012; G06F 3/0308; A63F 13/837; A63F 2300/8082; A63F 13/212; A63F 13/213; A63F 13/214; A63F 13/25; A63F 13/218; A63F 13/219; A63F 2300/1012; A63F 2300/1056; A63F 2300/8076; G06T 15/20; G02B 27/017
See application file for complete search history.

(56) References Cited

U.S. PATENT DOCUMENTS

| | | | |
|---|---|---|---|
| 2017/0148339 A1* | 5/2017 | Van Curen | A63F 13/211 |
| 2018/0113669 A1* | 4/2018 | Szeto | G06F 3/04815 |
| 2019/0022492 A1 | 1/2019 | Takahashi et al. | |
| 2019/0329136 A1* | 10/2019 | Koyama | A63F 13/55 |
| 2021/0106893 A1 | 4/2021 | Takahashi et al. | |
| 2022/0171949 A1* | 6/2022 | Xu | G06K 7/10366 |
| 2022/0314092 A1 | 10/2022 | Takahashi et al. | |

FOREIGN PATENT DOCUMENTS

WO 2017/131071 A1 8/2017

* cited by examiner

*Primary Examiner* — Premal R Patel
(74) *Attorney, Agent, or Firm* — Harness, Dickey & Pierce, P.L.C.

(57) ABSTRACT

An interface apparatus includes: a plurality of force plates provided over a floor of a real space; and an output section that provides, with respect to a plurality of users, a simulation apparatus configured to generate a virtual space with an output signal from a force plate 11 that has detected a foot pressure of a user and a signal indicating a position of the user on the floor and a posture of the user, the position and the posture each having been specified on the basis of a position of the force plate on the floor.

6 Claims, 3 Drawing Sheets

INTERFACE APPARATUS AND COEXISTENCE EXPERIENCE PROVIDING SYSTEM

This Nonprovisional application claims priority under 35 U.S.C. § 119 on Patent Application No. 2023-087220 filed in Japan on May 26, 2023, the entire contents of which are hereby incorporated by reference.

TECHNICAL FIELD

The present invention relates to an interface apparatus and a coexistence experience providing system.

BACKGROUND ART

Attention has been drawn to a technology that provides users with a coexistence experience in a virtual space (for example, metaverse technology). Examples of such a technology include a virtual environment construction apparatus disclosed in Patent Literature 1. The virtual environment construction apparatus disclosed in Patent Literature 1 provides users with a game experience from a player's perspective in a virtual space.

CITATION LIST

Patent Literature

Patent Literature 1

International Publication No. WO 2017/131071

SUMMARY OF INVENTION

Technical Problem

The virtual environment construction apparatus disclosed in Patent Literature 1 uses a plurality of cameras to optically measure positions and postures of the players in a real space and constructs a virtual environment on the basis of the measurement result. Thus, a problem may arise that it is impossible to accurately measure positions and postures of the players who have moved to the outside of the angle of view of the plurality of cameras or who hide behind other players (hide in a range that the optical measurement by the plurality of cameras does not cover).

An aspect of the present invention has been achieved in light of the foregoing problem. It is an object of the aspect of the present invention to achieve an interface apparatus that enables specifying positions and postures of users in a position on the floor.

Solution to Problem

An interface apparatus in accordance with an aspect of the present invention is an interface configured to provide a plurality of users with a coexistence experience in a virtual space, the interface apparatus including: a plurality of force plates that are provided over a floor of a first real space; and an output section that provides a simulation apparatus configured to generate the virtual space with, for each of the plurality of users, (i) an output signal from a force plate which has detected a foot pressure of a user and (ii) a first signal indicating a position of the user on the floor and a posture of the user, the position and the posture each having been specified in accordance with a position of the force plate in the first real space.

Advantageous Effects of Invention

According to an aspect of the present invention, it is possible to specify positions and postures of users in a position on the floor.

DESCRIPTION OF EMBODIMENTS (Configuration of Interface Apparatus)

Figure 1:
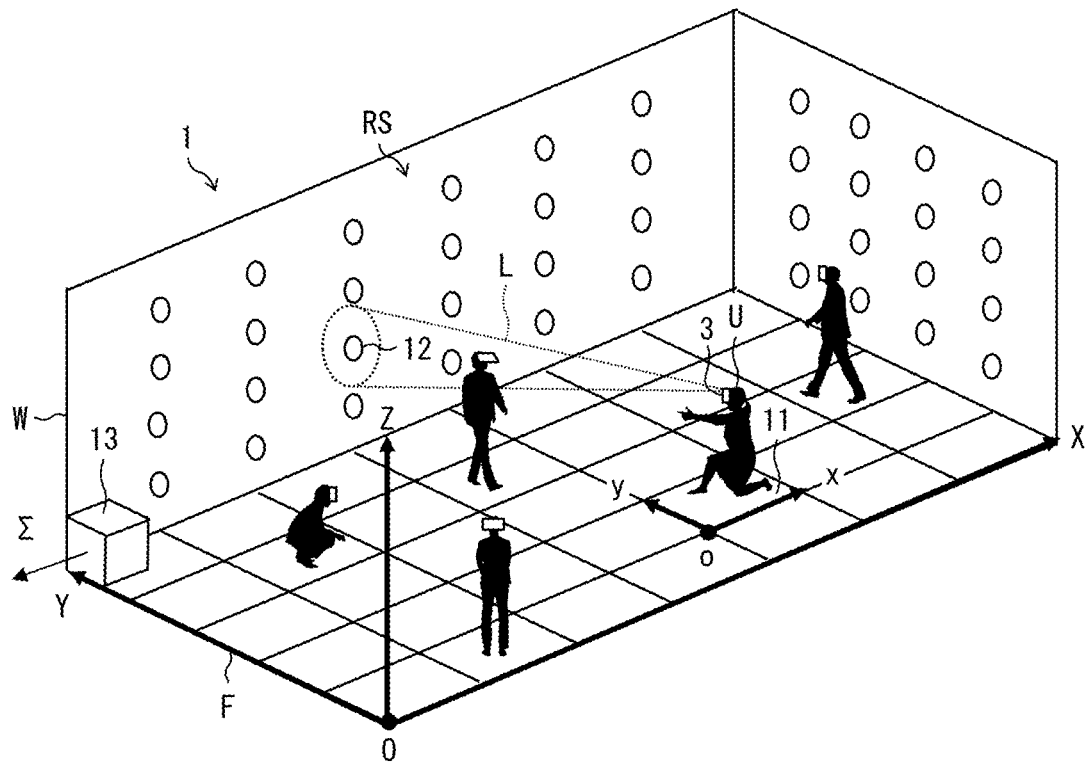
FIG. 1 is a perspective view illustrating a configuration of an interface apparatus in accordance with an embodiment of the present invention.

With reference to FIG. 1, the following description will discuss a configuration of an interface apparatus 1 in accordance with an embodiment of the present invention. FIG. 1 is a perspective view illustrating a configuration of the interface apparatus 1.

The interface apparatus 1 is a man-machine interface for providing a plurality of users U with a coexistence experience virtual in a space. As illustrated in FIG. 1, the interface apparatus 1 includes a plurality of force plates 11, a plurality of photodetectors 12, and an output section 13. The plurality of force plates 11 are provided over a floor F in a real space RS (in the present embodiment, a room). The plurality of photodetectors 12 are dispersedly provided on walls W of the real space RS. Note that in FIG. 1, out of the four walls W of the real space RS, two walls are illustrated. The plurality of photodetectors 12 are dispersedly provided also on the two walls that are not illustrated.

Note that used in the following descriptions are a global coordinate system (XYZ coordinate system) applied to the real space RS, a global coordinate system (XY coordinate system) applied to the floor F, and a local coordinate system (xy coordinate system) applied to each force plate 11. Here, the global coordinate system applied to the real space RS is a three-dimensional orthogonal coordinate system in which a corner of the floor F is an origin O. The global coordinate system applied to the floor F is a two-dimensional orthogonal coordinate system having the origin O common to the global coordinate system applied to the real space RS. The local coordinate system applied to each force plate 11 is a two-dimensional orthogonal coordinate system in which a corner of the upper surface of the force plate 11 is an origin o. The X axis of the global coordinate system applied to the floor F is identical with the X axis of the global coordinate system applied to the real space RS, and the Y axis of the global coordinate system applied to the floor F is identical with the Y axis of the global coordinate system applied to the real space RS. In addition, the x axis of the local coordinate system applied to each force plate 11 is parallel to the X axis of the global coordinate system applied to the real space RS, and the y axis of the local coordinate system applied to each force plate 11 is parallel to the Y axis of the global coordinate system applied to the real space RS. Further, the upper surface of each force plate 11 is included in the XY plane (Z=0) in the global coordinate system applied to the real space RS.

The force plates 11 are sensors for acquiring information required to specify positions of the users U on the floor F and postures of the users U. In the present embodiment, the force plates 11 are force plates each including a rectangular plate and four six-axis force sensors supporting the four corners of the plate. In this case, an output signal from each of the force plates 11 indicates a floor reaction force (Fx, Fy, Fz), the center of pressure (x, y), and a free moment N which are calculated from the force (fx, fy, fz) detected by these force sensors. The force plates 11 each supply an output signal indicating the detection result to the output section 13. Note that the plate included in each of the force plates 11 may have a square shape. In addition, the force sensor included in each of the force plates 11 may be a three-axis force sensor.

Note that in the present embodiment, in order to indicate a position of each force plates 11 on the floor F, a coordinate (Xo, Yo) of a representative point of the force plate 11 in the global coordinate system applied to the floor F is used. The representative point of each force plates 11 is the corner of the upper surface of the force plate 11, that is, the origin o of the local coordinate system applied to the force plate 11. In the following descriptions, the position (Xo, Yo) of the representative point of each force plate 11 on the floor F is simply referred to also as a position (Xo, Yo) of the force plate 11.

In the present embodiment, in order to indicate a position of each user U on the floor F, a coordinate (X, Y) of a representative point of the user U in the global coordinate system applied to the floor F is used. It is assumed that the representative point of each user U is the center of pressure (x, y) indicated by an output signal from the force plate 11 that has detected the foot pressure of the user U. In the following descriptions, the position (X, Y) of the representative point of each user U on the floor F is simply referred to also as a position (X, Y) of the user U. Note that with use of the position (Xo, Yo) of the force plate 11 that has detected the foot pressure of the user U, the position (X, Y) of the user U is represented as (X, Y)=(Xo+x, Yo+y).

The photodetectors 12 are sensors for acquiring information needed in order to specify a line-of-sight direction of each user U. In the present embodiment, the photodetectors 12 are photodetectors including photodiodes. In this case, an output signal from each of the photodetectors 12 indicates an intensity I of light that this photodiode has detected. The photodetectors 12 each supply an output signal indicating the detection result to the output section 13.

Note that in the present embodiment, each user U wears a head mounted display 3. The head mounted display 3 emits light L in the line-of-sight direction of the user U. The light that the photodetector 12 detects is the light L emitted from the head mounted display 3. Therefore, the real space RS is preferably a dark room. This is because when the real space RS is a dark room, the photodetectors 12 can accurately detect the light L emitted from the head mounted displays 3.

In the present embodiment, in order to indicate a position of each photodetector 12 in the real space RS, a coordinate (Xp, Yp) of the photodetector 12 in the global coordinate system applied to the real space RS is used. In the following descriptions, the position (Xp, Yp) of each photodetector 12 in the real space RS is simply referred to also as a position (Xp, Yp) of the photodetector 12.

The output section 13 is configured to generate a signal Σ indicating the position (X, Y), a posture P, and a line-of-sight direction (Vx, Vy, Vz) of each user U and provide a simulation apparatus 2 with the generated signal Σ. The output section 13 includes a memory storing the position (Xo, Yo) of each force plate 11 and the position (Xp, Yp, Zp) of each photodetector 12. An operation of the output section 13 will be described later with reference to another drawing.

(Operation of Output Section)

Figure 2:
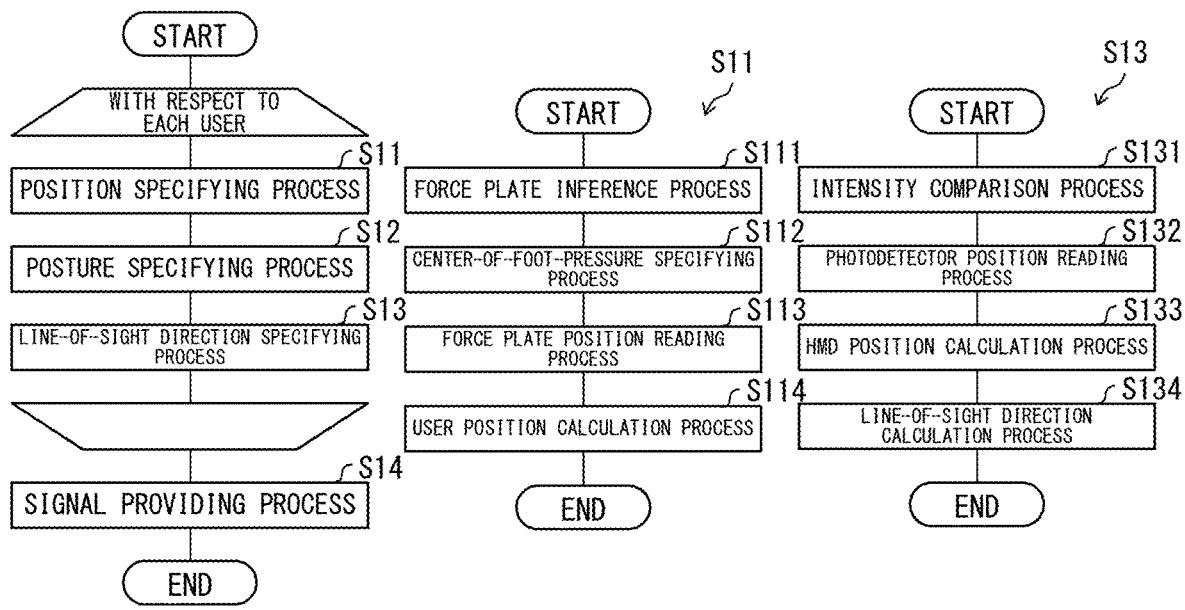
FIG. 2 is a flowchart illustrating a flow of an operation of an output section included in the interface apparatus illustrated in FIG. 1.

With reference to FIG. 2, the following description will discuss an operation of the output section 13 included in the interface apparatus 1 illustrated in FIG. 1. FIG. 2 is a flowchart illustrating a flow of the output section 13.

As illustrated in FIG. 2, the output section 13 performs, on each user U, a position specifying process S11, a posture specifying process S12, and a line-of-sight direction specifying process S13 and further performs a signal providing process S14. The output section 13 repeats these processes to provide the simulation apparatus 2 with the signal Σ indicating the position (X, Y), the posture P, and the line-of-sight direction (Vx, Vy, Vz) of each user U in each cycle.

The position specifying process S11 is a process of referring to the position (Xo, Yo) of the force plate 11 that has detected a foot pressure of a user U, to specify the position (X, Y) of the user U from an output signal (in particular, the center of foot pressure (x, y) indicated by the output signal) from the force plate 11. In the present embodiment, specified as the position (X, Y) of each user U is a coordinate (Xo+x, Yo+y), in the global coordinate system applied to the floor F, of the center of foot pressure (x, y) indicated by the output signal from the force plate 11 that has detected the foot pressure of the user U.

The position specifying process S11 includes, for example, a force plate inference process S111, a center-of-foot-pressure specifying process S112, a force plate position reading process S113, and a user position calculation process S114. The force plate inference process S111 is a process of inferring the force plate 11 that has detected the foot pressure of the user U in the current cycle, on the basis of the position (X, Y) and the posture P of the user U that had been specified in the previous cycle. The center-of-foot-pressure specifying process S112 is a process of specifying the center of foot pressure (x, y) from the output signal from the force plate 11 that has been inferred in the force plate inference process S111. The force plate position reading process S113 is a process of reading, from the memory, the position (Xo, Yo) of the force plate 11 that has been inferred in the force plate inference process S111. The user position calculation process S114 is a process of adding the position (Xo, Yo) that has been read in the force plate position reading process S113 to the center of foot pressure (x, y) that has been specified in the center-of-foot-pressure specifying process S112 individually for each component so as to calculate the position (X, Y)=(Xo+x, Yo+y) of the user U.

The posture specifying process S12 is a process of specifying the posture P of each user U from an output signal (in particular, the floor reaction force (Fx, Fy, Fz) indicated by the output signal) from the force plate 11 that has detected the foot pressure of the user U. In the present embodiment, whether the posture P of the user U is a sitting posture P1 or a standing posture P2 is identified. In addition, in a case where the posture P of the user U is the standing posture P2, whether the posture P of the user U is an upright posture P21 or a walking posture P22 is further identified. In addition, in a case where the posture P of the user U is a walking posture P22, whether the posture P of the user U is a left foot-weighted posture P22L (a posture in which the left foot rests on the floor F and the right foot is positioned forward) or a right foot-weighted posture P22R (a posture in which the right foot rests on the floor F and the left foot is positioned forward) is further identified. That is, in the present embodiment, whether the posture P of each of the user U is the sitting posture P1, the upright posture P21, the left foot-weighted posture P22L, or the right foot-weighted posture P22R is identified.

When the posture P of the user U changes from the standing posture P2 to the sitting posture P1, the floor reaction force (Fx, Fy, Fz) detected by the force plate 11 decreases temporarily. In contrast, when the posture P of the user U changes from the sitting posture P1 to the standing posture P2, the floor reaction force (Fx, Fy, Fz) detected by the force plate 11 increases temporarily. The output section 13 utilizes these properties to identify whether the posture P of the user U is the sitting posture P1 or the standing posture P2 from the floor reaction force (Fx, Fy, Fz) indicated by the output signal from the force plate 11.

When the posture P of the user U is the upright posture P21, the floor reaction force (Fx, Fy, Fz) is perpendicular to or substantially perpendicular to the floor F. Further, when the posture P of the user U is the walking posture P22, the floor reaction force (Fx, Fy, Fz) inclines in a travelling direction of the user U. The output section 13 utilizes these properties to identify whether the posture P of the user U is the upright posture P21 or the walking posture P22 from the floor reaction force (Fx, Fy, Fz) indicated by the output signal from the force plate 11.

When the posture P of the user U is the left foot-weighted posture P22L, the center of gravity of the user U is located on a right side of the center of pressure (x, y) (the point on which the left foot rests), and thus the floor reaction force (Fx, Fy, Fz) inclines rightward with respect to the travelling direction. In contrast, when the posture P of the user U is the right foot-weighted posture P22R, the center of gravity of the user U is located on a left side of the center of pressure (x, y) (the point on which the right foot rests), and thus the floor reaction force (Fx, Fy, Fz) inclines leftward with respect to the travelling direction. The output section 13 utilizes these properties to identify whether the posture P of the user U is the left foot-weighted posture P22L or the right foot-weighted posture P22R from the floor reaction force (Fx, Fy, Fz) indicated by the output signal from the force plate 11.

The line-of-sight direction specifying process S13 is a process of referring to the position (Xp, Yp, Zp) of each photodetector 12 to specify a line-of-sight direction (Vx, Vy, Vz) of each user U from an output signal from each photodetector 12. In the present embodiment, specified as the line-of-sight direction (Vx, Vy, Vz) of each user U is a vector (Xp−Xh, Yp−Yh, Zp−Zh) in which a starting point is a position (Xh, Yh, Zh), in the real space RS, of the head mounted display 3 worn by the user U and an ending point is a position (Xp, Yp, Zp), in the real space RS, of the photodetector 12 that has detected the light L emitted from the head mounted display 3. Note that it is assumed that while the line-of-sight direction specifying process S13 is being performed on a user U, only the head mounted display 3 worn by the user U emits the light L (the head mounted displays 3 worn by the other users U do not emit light).

The line-of-sight direction specifying process S13 includes, for example, an intensity comparison process S131, a photodetector position reading process S132, a head mounted display position calculation process S133, and a line-of-sight direction calculation process S134. The intensity comparison process S131 is a process of comparing intensities of light that the photodetectors 12 detect when the light L is emitted from the head mounted display 3 worn by the user U and specifying the photodetector 12 that has detected the most intense light. The photodetector position reading process S132 is a process of reading, from the memory, the position (Xp, Yp, Zp), in the real space RS, of the photodetector 12 that has been specified in the intensity comparison process S131. The head mounted display position calculation process S133 is a process of calculating the position (Xh, Yh, Zh)=(X, Y, H), in the real space RS, of the head mounted display 3 worn by the user U, on the basis of the position (X, Y) that has been specified in the position specifying process S11 and the posture P that has been specified in the posture specifying process S12. Here, the X and the Y are respectively the X coordinate and the Y coordinate of the position (X, Y) that has been specified in the position specifying process S11, and the H is a height of the head mounted display 3 determined depending on the posture P that has been specified in the posture specifying process S12. For example, in a case where the posture P of the user U is the sitting posture P1, the H is 80 cm, and in a case where the posture P of the user U is the standing posture P2 (either one of the upright posture P21, the left foot-weighted posture P22L, and the right foot-weighted posture P22R), the H is 160 cm. The line-of-sight direction calculation process S134 is a process of subtracting the position (Xh, Yh, Zh) that has been calculated in the head mounted display position calculation process S133 from the position (Xp, Yp, Zp) that has been read in the photodetector position reading process S132 individually for each component, so as to calculate the line-of-sight direction (Vx, Vy, Vz)=(Xp−Xh, Yp−Yh, Zp−Zh) of the user U.

The signal providing process S14 is a process of generating the signal Σ indicating the position (X, Y) of each user U which has been specified in the position specifying process S11, the posture P of each user U which has been specified in the posture specifying process S12, and the line-of-sight direction (Vx, Vy, Vz) of each user U which has been specified in the line-of-sight direction specifying process S13 and providing the simulation apparatus 2 with the generated signal c.

(Configuration of Coexistence Experience Providing System)

Figure 3:
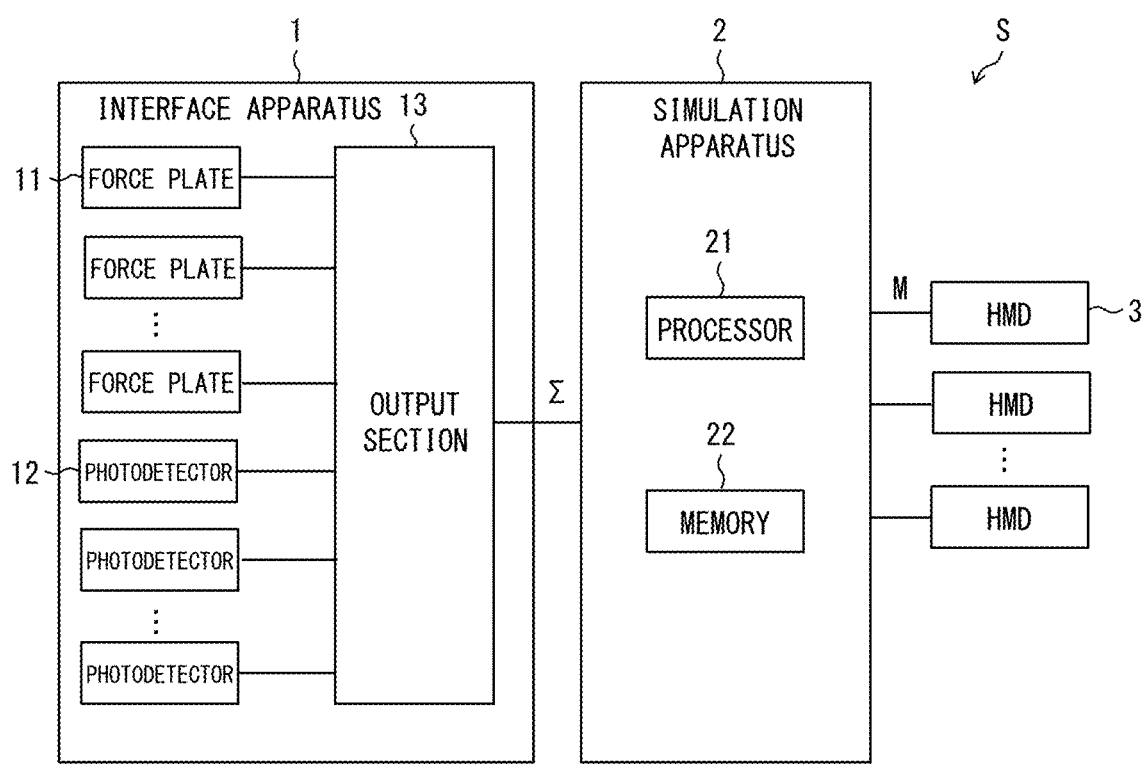
FIG. 3 is a block diagram illustrating a configuration of a coexistence experience providing system including the interface apparatus illustrated in FIG. 1.

With reference to FIG. 3, the following description will discuss the configuration of a coexistence experience providing system S in accordance with an embodiment of the present invention. FIG. 3 is a block diagram illustrating a configuration of the coexistence experience providing system S.

As illustrated in FIG. 3, the coexistence experience providing system S includes the simulation apparatus 2 and the head mounted displays 3, as well as the interface apparatus 1 described above. The simulation apparatus 2 includes a processor 21 and a memory 22. Note that in FIG. 3, the "head mounted display" is abbreviated as "HMD". The interface apparatus 1 and the simulation apparatus 2 are configured to be communicable with each other through wireless communication or wired communication. In addition, the simulation apparatus 2 and each head mounted display 3 are configured to be communicable with each other through wireless communication.

As described above, the interface apparatus 1 generates a signal Σ indicating the position (X, Y), a posture P, and a line-of-sight direction (Vx, Vy, Vz) of each user U and provides the simulation apparatus 2 with the generated signal C. The simulation apparatus 2 acquires this signal Σ from the interface apparatus 1. The simulation apparatus 2 then generates images M each indicating a virtual space VS seen from a corresponding one of the users U, on the basis of the signal Σ and provides the generated images M for the head mounted displays m worn by the corresponding users U. The processor 21 performs, in accordance with an instruction from a program stored in the memory 22, the process of generating the images M each indicating the virtual space VS seen from a corresponding one of the users U, on the basis of the signal. The respective head mounted displays 3 acquire the images M from the simulation apparatus 2. Then, head mounted displays 3 displays the images M.

The signal Σ that the interface apparatus 1 provides for the simulation apparatus 2 includes information indicating the position (X, Y) and the posture P of each user U. Therefore, the simulation apparatus 2 can generate the virtual space VS including avatars which correspond to the users U and which accurately reflect the positions (X, Y) and the postures P of the corresponding users U in the real space RS. In addition, the signal Σ that the interface apparatus 1 provides for the simulation apparatus 2 includes information indicating the position (X, Y) and the line-of-sight direction (Vx, Vy, Vz) of each user U. Therefore, the simulation apparatus 2 can generate the images M each of which indicates the generated virtual space VS from a perspective of a corresponding one of the users U and accurately reflects the position (X, Y) and the line-of-sight direction (Vx, of Vy, Vz) the corresponding one of the users U in the real space RS. This enables the plurality of users U present in the real space RS to feel as if the users U coexisted in the virtual space VS.

Note that examples of an application of the coexistence experience providing system S include a shooter game. In this case, the coexistence experience providing system S further includes replica guns. When a user U pulls the trigger of a replica gun, the simulation apparatus 2 calculates a trajectory of a bullet which has been virtually fired from the replica gun. The simulation apparatus 2 then processes the images M to be provided for the head mounted displays 3 worn by the corresponding users U, on the basis of the calculated trajectory. As an example, the image M provided for the user U shot (the user U located on the trajectory calculated) is faded to black, and a message indicating being shot is displayed. In addition, the avatar corresponding to the user U shot is erased from the images M provided for the other users U.

(Variation of Coexistence Experience Providing System)

Figure 4:
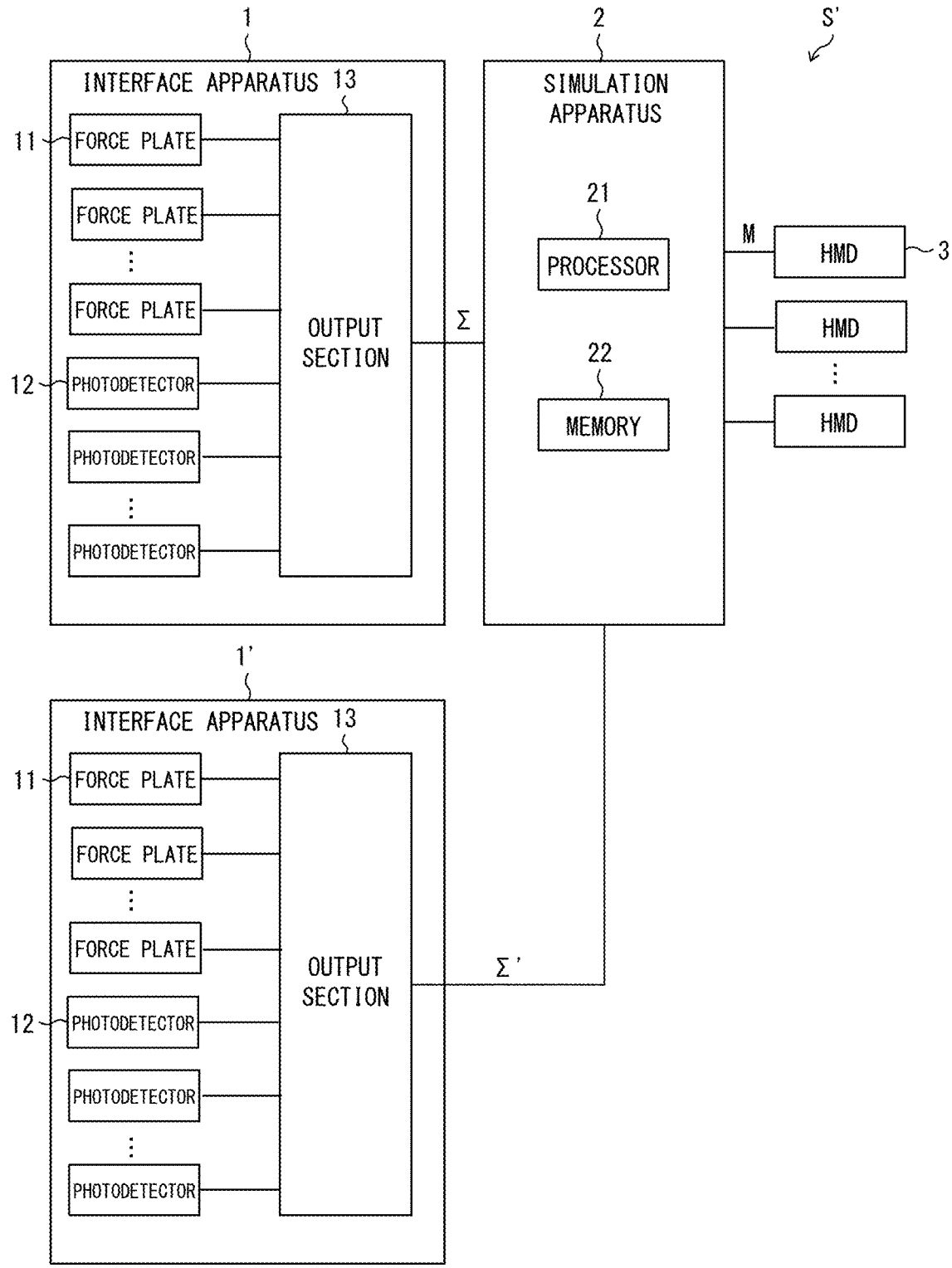
FIG. 4 is a block diagram illustrating a variation of the coexistence experience providing system illustrated in FIG. 3.

With reference to FIG. 4, the following description will discuss a variation of the coexistence experience providing system S illustrated in FIG. 3. FIG. 4 is a block diagram illustrating a configuration of a coexistence experience providing system S' in accordance with the present variation.

The coexistence experience providing system S' in accordance with the present variation is obtained by adding an interface apparatus 1' different from the interface apparatus 1 to the coexistence experience providing system S illustrated in FIG. 3. The other interface apparatus 1' is configured as in the case of the interface apparatus 1 and has the same function as that of the interface apparatus 1. The interface apparatuses 1 and 1' and the simulation apparatus 2 are configured to be communicable with each other through wireless communication or wired communication. In addition, the simulation apparatus 2 and each head mounted display 3 are configured to be communicable with each other through wireless communication.

The interface apparatus 1 generates a signal Σ indicating the position (X, Y), the posture P, and the line-of-sight direction (Vx, Vy, Vz) of each user U present in the real space RS and provides the simulation apparatus 2 with the generated signal Σ. The other interface apparatus 1' generates a signal Σ' indicating a position (X, Y), a posture P, and a line-of-sight direction (Vx, Vy, Vz) of each of users U' present in a real space RS' different from the real space RS and provides the simulation apparatus 2 with the generated signal Σ'. The simulation apparatus 2 acquires these signals Σ and Σ' from the interface apparatuses 1 and 1', respectively. The simulation apparatus 2 then generates, on the basis of these signals Σ and Σ', images M and M' each indicating a virtual space VS seen from a corresponding one of the users U and U' and provides the head mounted displays 3 worn by the corresponding users U and U' with the generated images M and M'. The respective head mounted displays 3 acquire the images M and M' from the simulation apparatus 2. Then, the respective head mounted displays 3 display the images M and M'.

The coexistence experience providing system S' in accordance with the present variation makes it possible to provide the users U and U' present in the different real spaces RS and RS' with an experience of coexisting in the same virtual space VS.

(Recap)

An interface apparatus in accordance with Aspect 1 of the present invention is an interface apparatus configured to provide a plurality of users with a coexistence experience in a virtual space, the interface apparatus including: a plurality of force plates that are provided over a floor of a first real space; and an output section that provides a simulation apparatus configured to generate the virtual space with, for each of the plurality of users, (i) an output signal from a force plate which has detected a foot pressure of a user and (ii) a first signal indicating a position of the user on the floor and a posture of the user, the position and the posture each having been specified in accordance with a position of the force plate in the first real space.

In the interface apparatus in accordance with Aspect 1, an interface apparatus in accordance with Aspect 2 of the present invention further includes a plurality of photodetectors that are dispersedly provided on a wall of the first real space and that are configured to detect light emitted from a head mounted display worn by the user, the first signal for each of the plurality of users further indicating a line-of-sight direction of the user, the line-of-sight direction having been specified in accordance with an output signal from each of the plurality of photodetectors.

A coexistence experience providing system in accordance with Aspect 3 of the present invention includes: the interface apparatus in accordance with Aspect 1 or 2; and the simulation apparatus, the simulation apparatus generating, in accordance with the first signal, an image of the virtual space which is seen from the user and which includes an avatar of another user, and supplying the generated image to the head mounted display worn by the user.

In the coexistence experience providing system in accordance with Aspect 3, the coexistence experience providing system in accordance with Aspect 4 of the present invention is configured such that: the simulation apparatus acquires, from another interface apparatus different from said interface apparatus, a second signal indicating a position of the user in a second real space different from the first real space and a posture of the user in the second real space, and the simulation apparatus (i) generates, in accordance with the first signal and the second signal, an image of the virtual space which is seen from the user in the first real space or in the second real space and which includes the avatar of the another user in the first real space and the avatar of still another user in the second real space and (ii) supplies the generated image to the head mounted display worn by the user.

In the coexistence experience providing system in accordance with Aspect 3, the coexistence experience providing system in accordance with Aspect 5 of the present invention further includes a replica gun that is carried by the user, the simulation apparatus calculating a trajectory of a bullet which has been virtually fired from the replica gun, and processing, in accordance with the calculated trajectory, the image which is to be supplied to the head mounted display worn by the user.

The invention claimed is:

1. An interface apparatus comprising:
  a plurality of force plates that are provided over a floor of a first real space; and
  an output section that provides a simulation apparatus configured to generate a virtual space with, for each of a plurality of users, (i) an output signal from a force plate which has detected a foot pressure of a user and (ii) a first signal indicating a position of the user on the floor and a posture of the user, the position and the posture each having been specified in accordance with a position of the force plate in the first real space, wherein
  the output signal indicates at least a floor reaction force,
  in a case where the floor reaction force decreases temporarily, the output section identifies that the posture of the user is a sitting posture, and
  in a case where the floor reaction force increases temporarily, the output section identifies that the posture of the user is a standing posture.

2. The interface apparatus according to claim 1, further comprising a plurality of photodetectors that are dispersedly provided on a wall of the first real space and that are configured to detect light emitted from a head mounted display worn by the user,
  the first signal for each of the plurality of users further indicating a line-of-sight direction of the user, the line-of-sight direction having been specified in accordance with an output signal from each of the plurality of photodetectors.

3. A coexistence experience providing system comprising:
  the interface apparatus according to claim 1; and
  the simulation apparatus,
  the simulation apparatus generating, in accordance with the first signal, an image of the virtual space which is seen from the user and which includes an avatar of another user, and supplying the generated image to a head mounted display worn by the user.

4. The coexistence experience providing system according to claim 3, wherein:
  the simulation apparatus acquires, from another interface apparatus different from said interface apparatus, a second signal indicating a position of the user in a second real space different from the first real space and a posture of the user in the second real space; and
  the simulation apparatus (i) generates, in accordance with the first signal and the second signal, an image of the virtual space which is seen from the user in the first real space or in the second real space and which includes the avatar of the another user in the first real space and the avatar of still another user in the second real space and (ii) supplies the generated image to the head mounted display worn by the user.

5. The coexistence experience providing system according to claim 3, further comprising a replica gun that is carried by the user,
  the simulation apparatus calculating a trajectory of a bullet which has been virtually fired from the replica gun, and processing, in accordance with the calculated trajectory, the image which is to be supplied to the head mounted display worn by the user.

6. An interface apparatus comprising:
  a plurality of force plates that are provided over a floor of a first real space; and
  an output section that provides a simulation apparatus configured to generate a virtual space with, for each of a plurality of users, (i) an output signal from a force plate which has detected a foot pressure of a user and (ii) a first signal indicating a position of the user on the floor and a posture of the user, the position and the posture each having been specified in accordance with a position of the force plate in the first real space, wherein
  the output signal indicates at least a floor reaction force,
  in a case where the floor reaction force is perpendicular to the floor, the output section identifies that the posture of the user is an upright posture, and
  in a case where the floor reaction force inclines with respect to the floor, the output section identifies that the posture of the user is a walking posture.

* * * * *